W. DALTON.
NON-CHATTERING BRAKE HANGER.
APPLICATION FILED JUNE 16, 1908.
902,477.
Patented Oct. 27, 1908.
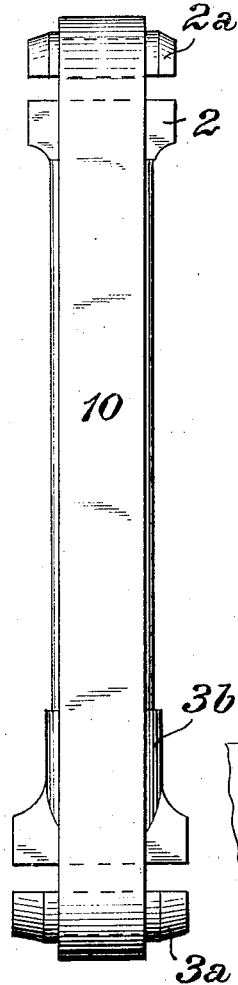
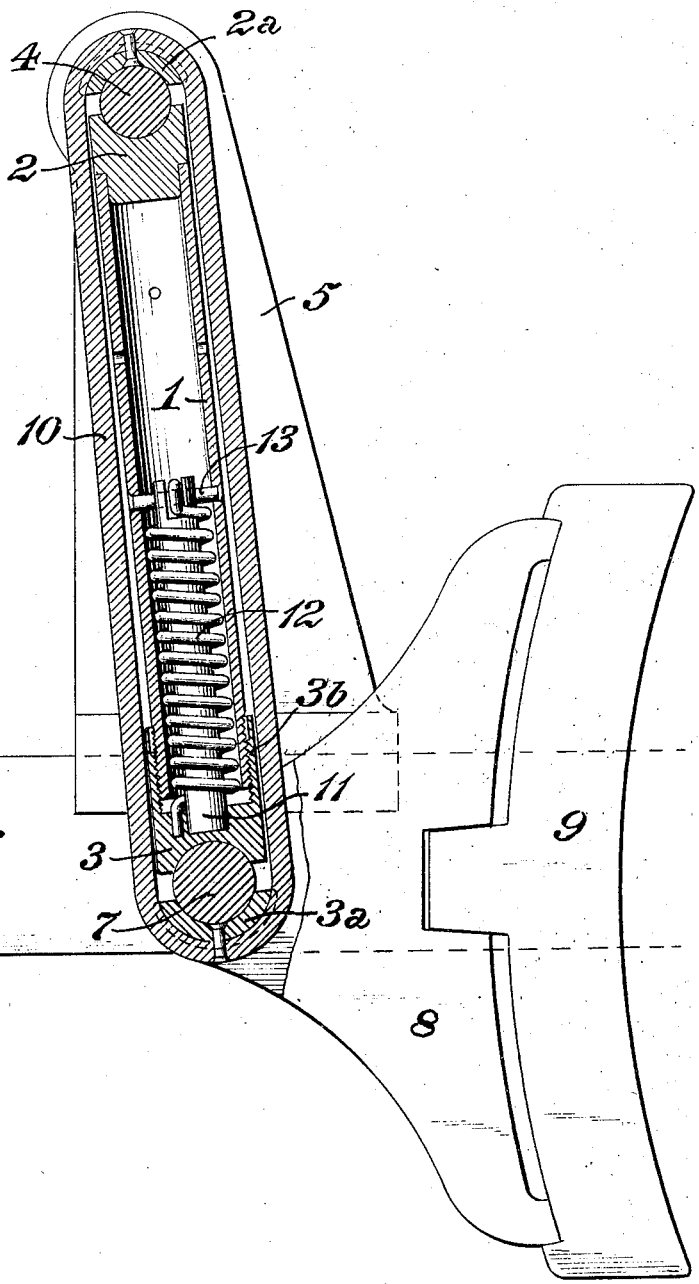
WITNESSES
Jas. C. Herron
S. R. Bell
INVENTOR
Wm Dalton

UNITED STATES PATENT OFFICE.

WILLIAM DALTON, OF SCHENECTADY, NEW YORK, ASSIGNOR TO AMERICAN LOCOMOTIVE COMPANY, OF NEW YORK, N. Y., A CORPORATION OF NEW YORK.

NON-CHATTERING BRAKE-HANGER.

No. 902,477.

Specification of Letters Patent.

Patented Oct. 27, 1908.

Application filed June 16, 1908. Serial No. 438,722.

*To all whom it may concern:*

Be it known that I, WILLIAM DALTON, of Schenectady, in the county of Schenectady and State of New York, have invented a certain new and useful Improvement in Non-Chattering Brake-Hangers, of which improvement the following is a specification.

The object of my invention is to provide a brake hanger in the use of which the objectionable noise ordinarily made in the application of the brakes may be avoided, this noise being due to the excessive wear and lost motion between the brake hanger and its pins resultant upon frequent applications of the brakes, and which are particularly occasioned in the brake rigging of electric motor cars.

The improvement claimed is hereinafter fully set forth.

In the accompanying drawing: Figure 1 is a longitudinal central section through a brake hanger embodying my invention, with the support and brake head and shoe in elevation, and; Fig. 2, a view, in elevation, of the brake hanger, taken at right angles to Fig. 1.

In the practice of my invention, I provide a hollow or tubular strut, 1, having an inner upper bearing, 2, so fitted in one of its ends that the strut may turn freely upon it, and an inner lower bearing, 3, connected to its lower end by an external screw thread on the strut which engages a corresponding internal screw thread on a tubular extension, 3$^b$, of the lower inner bearing which surrounds the end portion of the strut. The upper and lower inner bearings are suitably segmentally recessed to fit, respectively, the surfaces of a suspending pin, 4, connected to a support, 5, on a member of the truck frame, 6, and of a brake shoe pin, 7, fixed in a brake head, 8, which carries a brake shoe, 9, of the usual form. Outer bearings, 2$^a$ and 3$^a$, are fitted on the pins, 4 and 7, respectively, and the strut and bearings are held in assembled relation by a strap, 10, which passes around the outer bearings.

A rod or stem, 11, is fitted in the lower bearing, 3, and extends upwardly therefrom in the strut, and a helical spring, 12, is coiled around said rod, the lower end of said spring being inserted in a hole in the inner lower bearing, 3, and its upper end being turned over a rivet or pin, 13, fixed in the strut, 1, and passing freely through longitudinal slots in the rod, 11, at and near its upper end, the rod being similarly slotted at right angles to allow the end of the spring, 12, to be connected to the rivet, 13.

In the operation of the appliance, as the end pins and bearings of the brake hanger become worn in use, the resultant lost motion is taken up by the action of the spring, 12, which turns the strut on the internal screw of the inner lower bearing, thus increasing the operative length of the strut and maintaining the pins and bearing sections in normal operative relation, thereby preventing the chattering which would be occasioned by undue looseness of the parts. The tension of the spring is so adjusted as to enable it to take up the lost motion without clamping the bearing sections on the pins sufficiently tight to interfere with the free working of the brakes.

I claim as my invention and desire to secure by Letters Patent:

1. In a brake hanger, the combination of end bearing sections recessed to fit on brake hanger pins, a compression member imposing outward pressure upon said bearing sections, a tension member imposing inward pressure upon said bearing sections, and means for automatically increasing the operative length of the compression member in correspondence with wear of the parts.

2. In a brake hanger, the combination of end bearing sections recessed to fit on brake hanger pins, an intermediate strut interposed between said bearing sections, an inclosing strap forming the outer abutments of said bearing sections, and means for automatically increasing the operative length of the strut in correspondence with wear of the parts.

3. In a brake hanger, the combination of end bearing sections recessed to fit on brake hanger pins, a rotatable intermediate strut interposed between said bearing sections, an inclosing strap forming the outer abutments of said bearing sections, and means for automatically rotating said intermediate strut and thereby increasing its operative length in correspondence with wear of the parts.

4. In a brake hanger, the combination of end bearing sections recessed to fit on brake hanger pins, a strut interposed between the bearing sections, said strut being fitted to turn freely in a bearing section at one of its ends, and having a screw threaded engagement with a bearing section at its opposite end, and a helical spring connected at one end to the strut and at the other to the bearing section having a threaded connection with the strut.

WILLIAM DALTON.

Witnesses:
F. T. MARKS,
S. W. TYLER.